United States Patent
Yu et al.

(10) Patent No.: US 7,183,723 B2
(45) Date of Patent: *Feb. 27, 2007

(54) PWM ILLUMINATION CONTROL CIRCUIT WITH LOW VISUAL NOISE FOR DRIVING LED

(75) Inventors: Chung-Che Yu, Taipei (TW); Bor-Yuh Chang, Taipei (TW); Shih-Chung Huang, Taipei (TW)

(73) Assignee: Beyond Innovation Technology Co., Ltd., Taipei (TW)

( * ) Notice: Subject to any disclaimer, the term of this patent is extended or adjusted under 35 U.S.C. 154(b) by 9 days.

This patent is subject to a terminal disclaimer.

(21) Appl. No.: 10/708,212

(22) Filed: Feb. 17, 2004

(65) Prior Publication Data

US 2005/0122060 A1    Jun. 9, 2005

(30) Foreign Application Priority Data

Dec. 8, 2003    (TW) .............................. 92134517 A

(51) Int. Cl.
*H05B 41/16* (2006.01)
(52) U.S. Cl. .................. 315/247; 315/246; 315/209 R; 315/224; 315/291
(58) Field of Classification Search ............ 315/209 R, 315/224, 225, 247, DIG. 4, 291, 307
See application file for complete search history.

(56) References Cited

U.S. PATENT DOCUMENTS

| | | | |
|---|---|---|---|
| 6,057,651 A * | 5/2000 | Usami ........................ 315/291 |
| 6,304,464 B1 * | 10/2001 | Jacobs et al. ............ 363/21.12 |
| 6,586,890 B2 | 7/2003 | Min et al. .................... 315/224 |
| 2003/0030385 A1 * | 2/2003 | Toyama ...................... 315/291 |
| 2003/0085749 A1 * | 5/2003 | Xu et al. ..................... 327/423 |
| 2003/0151601 A1 * | 8/2003 | Chung et al. ............... 345/211 |

FOREIGN PATENT DOCUMENTS

KR    306417    11/2001

* cited by examiner

*Primary Examiner*—Tuyet Thi Vo
(74) *Attorney, Agent, or Firm*—Jianq Chyun IP Office

(57) ABSTRACT

A pulse width modulation (PWM) illumination control circuit with a low visual noise for driving a light-emitting diode (LED) is provided. An illumination control pulse-generating unit is used to generate an illumination control pulse signal according to an illumination-adjusting signal. A duty cycle, a phase shift or a frequency of the illumination control pulse signal varies with time within a predetermined scope for controlling a DC/DC converter to drive the light-emitting diode so that the overall visual noise level of the PWM illumination control circuit is improved.

4 Claims, 4 Drawing Sheets

PWM ILLUMINATION CONTROL CIRCUIT WITH LOW VISUAL NOISE FOR DRIVING LED

CROSS-REFERENCE TO RELATED APPLICATION

This application claims the priority benefit of Taiwan application serial no. 92134517, filed Dec. 8, 2003.

BACKGROUND OF THE INVENTION

1. Field of the Invention

The present invention relates to an illumination control circuit. More particularly, the present invention relates to a pulse width modulation (PWM) illumination control circuit with low visual noise for driving a light-emitting diode (LED).

2. Description of the Related Art

In recent years, conventional cathode ray tubes (CRT) are gradually being replaced by liquid crystal displays (LCD) due to big improvements in the semiconductor manufacturing techniques. LCD has many advantages over CRT including lower power consumption, a lighter weight, a higher resolution, higher degree of color saturation and a longer service life. For these advantages, LCD is being widely used in many electronic products including digital cameras, notebook computers, desktop monitors, mobile phones, personal digital assistants (PDA), car television, global positioning systems (GPS), palm-top game player, electronic translators and even digital watches and so on.

In general, a liquid crystal display uses an array of light-emitting diodes (LED) driven by a simple driving circuit to serve as a light source. However, due to the special properties of an LED, brightness of the LED is not linearly related to the driving current. Furthermore, color of the LED may also vary according to the driving current. Hence, for a liquid crystal display that uses LED as a back light or illumination system, difficulties are often encountered when the illumination is varied by directly adjusting the driving current.

To avoid the difficulties of illumination adjustment through an amplitude variation of the driving current, a driving current with a constant amplitude is used with the illumination adjustment achieved through a pulse width modulation (PWM) of the driving current. Ultimately, the LED is able to produce a consistent emitting efficiency within a broad range.

FIG. 1 is a block diagram of a conventional pulse width modulation illumination control circuit. FIG. 2 is a diagram showing the relationships between illumination control pulse signals and light-emitting diode driving current signals for the circuit in FIG. 1. In FIG. 1, an illumination control pulse signal Con that sets the illumination of the light-emitting diode is sent to a DC/DC converter 110 to produce a light-emitting diode driving current signal Id for driving a light-emitting diode. The waveform diagrams (a), (b) and (c) shown in FIG. 2 represent three different pulse width settings of the light-emitting diode driving current signals Id. For example, the light-emitting diode is at full illumination (100%) in FIG. 2 (a), at 20% of the full illumination in FIG. 2 (b) and at 50% of the full illumination in FIG. 2 (c).

To prevent any perceived flickering in the light-emitting diode by the human eyes, the frequency of the illumination control pulse signal Con cannot be too low, typically above 200 Hz. In other words, the illumination control pulse signal Con must operate at a sufficiently high frequency so that the human eyes can retain a visual image and yet perceive a steady change of illumination without flickering. Obviously, these control signals may be implemented using a simple switching circuit that controls the on/off states of the entire DC/DC converter.

Because the frequency and duty cycle of the aforementioned illumination control pulse signal Con is set to be fixed according to the required illumination, interference with the vertical, horizontal scanning signals may occur when used as the back light in a liquid crystal display. The difference in frequency between the back light and the video signals often leads to a so-called 'fanning effect', a watery wave pattern of an image on a display screen. In addition, the switching on or off of the DC/DC converter also leads to a significant loading on the power supply that provides power to the DC/DC converter. In other words, a ripple waveform synchronized with the illumination control pulse signal Con is also produced in the power supply. Once again, the ripple waveform may affect the video display signals leading to a flickering screen.

To prevent an interference between the illumination control pulse signal Con and the vertical, as well as the horizontal scanning signals due to their frequencies difference, the illumination control pulse signal Con and the horizontal scanning signals are synchronized to a frequency an integral multiple of each other. However, this arrangement will increase the production cost. To reduce the ripple waveform in the power supply, the frequency of the illumination control pulse signal Con can be increased. Yet, increasing the frequency of the pulse signal Con leads to higher power consumption. With the demand for a larger display screen and a lesser visual noise, fabricating a light-emitting diode illuminated liquid crystal display with a low noise and a broad adjustable range of illumination is increasingly difficult.

SUMMARY OF THE INVENTION

Accordingly, one objective of the present invention is to provide a pulse width modulation (PWM) illumination control circuit with a low visual noise for driving a light-emitting diode (LED). By varying a duty cycle or frequency of an illumination control pulse signal and maintaining the average duty cycle and frequency, a visual noise interference due to a pulse width modulation is reduced.

To achieve these and other advantages and in accordance with the purpose of the invention, as embodied and broadly described herein, the invention provides a low visual noise pulse width modulation (PWM) illumination control circuit for controlling the illumination of light-emitting diodes inside a liquid crystal display. The low visual noise (PWM) illumination control circuit comprises an illumination control pulse generating unit and a DC/DC converter. The illumination control pulse-generating unit receives an illumination-adjusting signal. According to the illumination-adjusting signal, the illumination control pulse-generating unit generates an illumination control pulse signal having a duty cycle set to vary within a predetermined range. The DC/DC converter is coupled to the illumination control pulse-generating unit so that the illumination control pulse-generating unit can drive the light-emitting diodes according to the illumination control pulse signal.

In one embodiment of the invention, the illumination control pulse-generating unit of the low visual noise PWM illumination control circuit further comprises a noise generator, an analogue adder and a comparator. The noise generator generates a noise signal. The analogue adder is coupled to the noise generator for receiving the illumination-adjusting signal and the noise signal to produce a noise signal loaded illumination-adjusting signal. The comparator is coupled to the analogue adder for comparing the noise signal loaded illumination-adjusting signal with a triangular wave and producing the illumination control pulse signal.

In one embodiment of the invention, the noise signal level produced by the low visual noise PWM illumination control circuit can be adjusted.

The present invention also provides an alternative low visual noise PWM illumination control circuit for controlling the illumination of light-emitting diodes inside a liquid crystal display. The low visual noise PWM illumination control circuit comprises an illumination control pulse generating unit and a DC/DC converter. The illumination control pulse-generating unit receives an illumination-adjusting signal. According to the illumination-adjusting signal, the illumination control pulse-generating unit generates an illumination control pulse signal having a frequency set to vary with time within a predetermined range. The DC/DC converter is coupled to the illumination control pulse-generating unit so that the illumination control pulse-generating unit can drive the light-emitting diodes according to the illumination control pulse signal.

In one embodiment of the invention, the operations carried out by the illumination control pulse-generating unit of the low-visual-noise-PWM-illumination-control circuit, are performed by using a microprocessor.

In one embodiment of the invention, a phase shift of the illumination control pulse signal produced by the low-visual-noise-PWM-illumination-control circuit also varies with time within a predetermined range.

Accordingly, the present invention provides a low-visual-noise-PWM-illumination-control circuit for driving light-emitting diodes such that a visual noise interference due to a pulse width modulation is reduced by varying a duty cycle or frequency with time of an illumination control pulse signal and maintaining a constant average duty cycle and frequency in the time domain.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The following drawings illustrate embodiments of the invention and, together with the description, serve to explain the principles of the invention.

DESCRIPTION OF THE PREFERRED EMBODIMENTS

Figure 1:
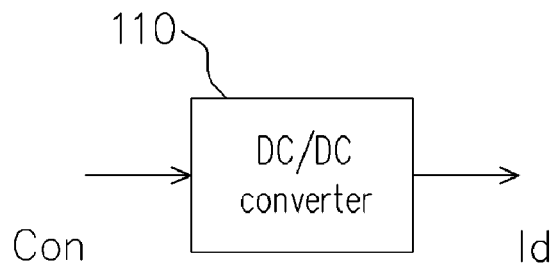
FIG. 1 is a block diagram of a conventional pulse width modulation illumination control circuit.
Figure 2:
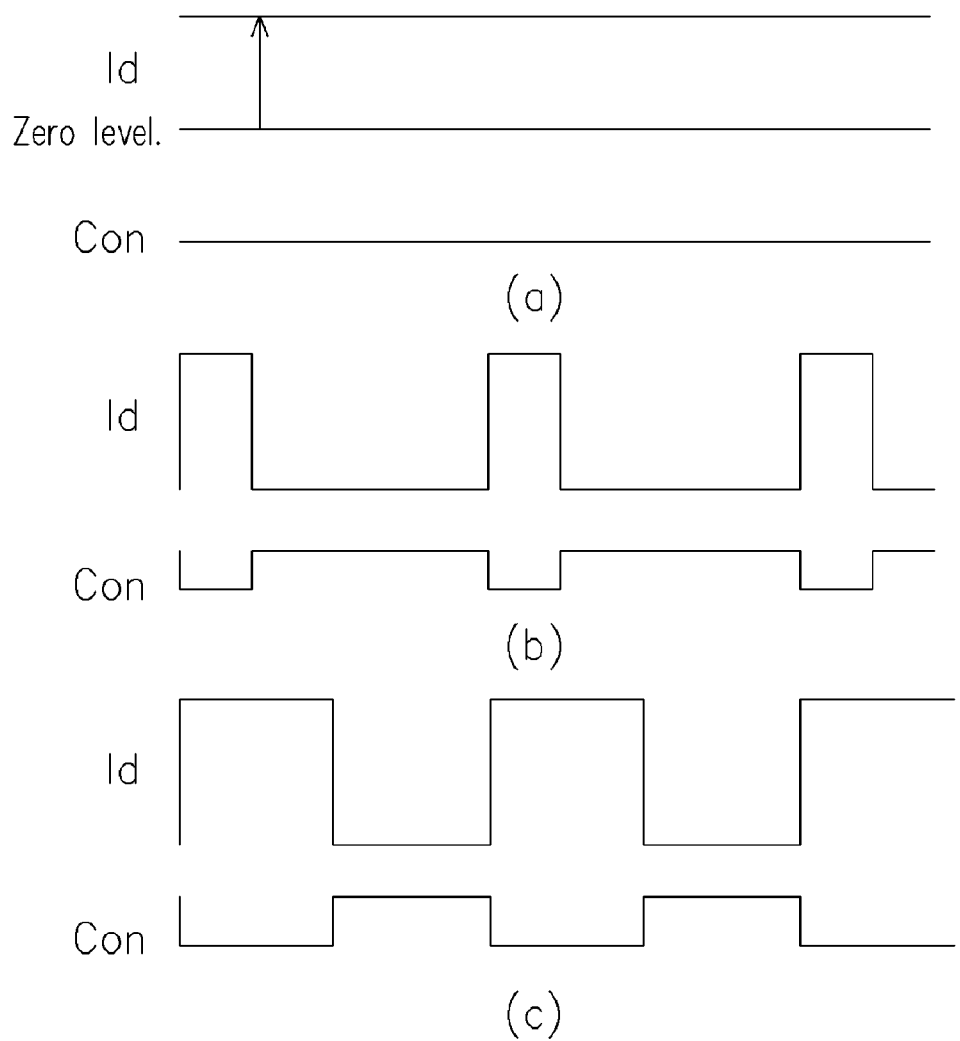
FIG. 2 is a diagram showing the relationships between illumination control pulse signals and light-emitting diode driving current signals for the circuit in FIG. 1.

Reference will now be made in detail to the present preferred embodiments of the invention, examples of which are illustrated in the accompanying drawings. Wherever possible, the same reference numbers are used in the drawings and the description to refer to the same or like parts.

Figure 3:
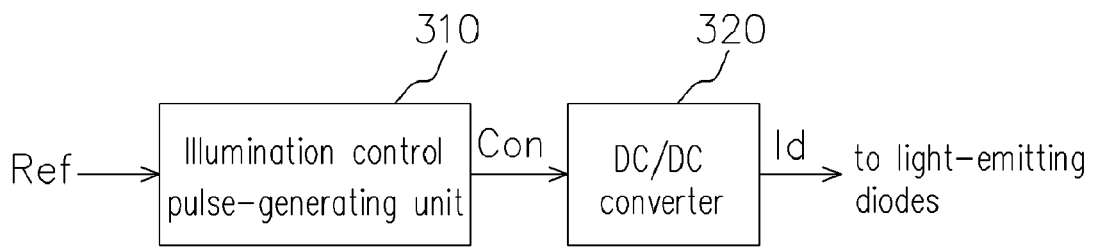
FIG. 3 is a block diagram of a low-visual-noise-PWM-illumination-control circuit for driving a light-emitting diode according to one preferred embodiment of the present invention.

FIG. 3 is a block diagram of a low-visual-noise-PWM-illumination-control circuit for driving a light-emitting diode according to one preferred embodiment of the present invention. The low visual noise PWM illumination control circuit 300 in FIG. 3 is adapted to control the illumination level of light-emitting diodes (not shown) inside a liquid crystal display. The low visual noise PWM illumination control circuit 300 comprises an illumination control pulse-generating unit 310 and a DC/DC converter 320. The illumination control pulse-generating unit 310 is used for receiving an illumination-adjusting signal Ref. According to the illumination-adjusting signal Ref, the illumination control pulse-generating unit 310 generates an illumination control pulse signal Con. To improve the visual noise interference of the pulse width modulation, the duty cycle or frequency of the illumination control pulse signal Con is permitted to vary within a predetermined range. Hence, differential frequency interference between a fixed illumination control pulse signal Con and the vertical/horizontal scanning signals leading to the so-called 'fanning effect' with wavy lines on the display screen is prevented. In addition, the DC/DC converter 320 drives the light-emitting diodes according to the illumination control pulse signal Con generated by the illumination control pulse-generating unit 310.

Figure 4:
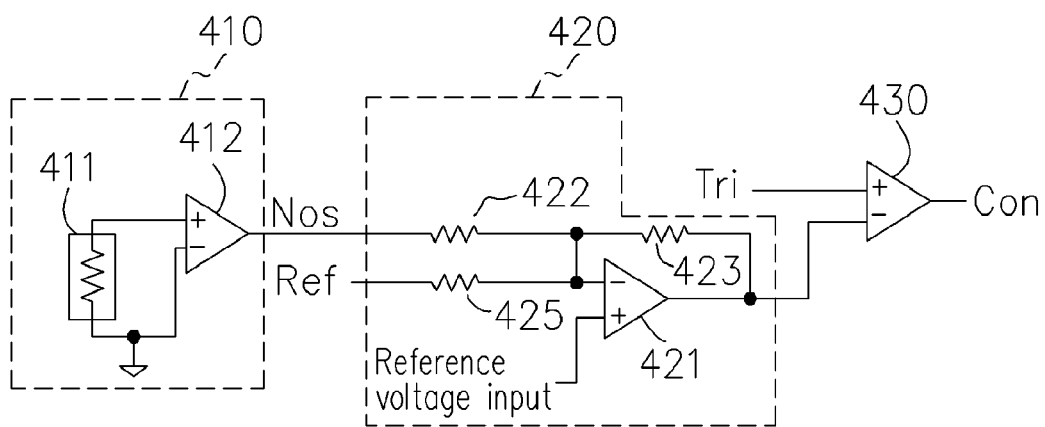
FIG. 4 is a circuit diagram of an illumination control pulse-generating unit according to the preferred embodiment of the present invention.

FIG. 4 is a circuit diagram of an illumination control pulse-generating unit according to the preferred embodiment of the present invention. As shown in FIG. 4, the illumination control pulse-generating unit 400 comprises a noise generator 410, an analogue adder 420 and a comparator 430. The noise generator 410 further comprises a resistor 411 and an amplifier 421 electrically connected together and the analogue adder 420 further comprises a plurality of resistors 422, 423, 425 and an amplifier 421 electrically connected together. The noise generator 410 outputs a noise signal Nos after the amplifier 412 comprised in the noise generator 410 amplifies the thermal noise produced by the resistor 411. The noise signal Nos is transmitted to the analogue adder circuit 420 such that the noise signal Nos and an illumination-adjusting signal Ref originally set to control the output duty cycle of the DC voltage are summed together to produce a noise signal loaded illumination-adjusting signal Ref. In addition, as the thermal noise produced by the resistor 411 has random voltage amplitudes that vary with time, voltage amplitudes of the noise signal Nos vary with time. The resistor 422 is a variable resistor so that the level of the noise signal Nos loaded on the illumination-adjusting signal Ref can be adjusted. The noise signal loaded illumination-adjusting signal Ref is transmitted to the comparator 430 where the signal is compared with a triangular wave Tri to produce an illumination control pulse signal Con having a duty cycle that varies with time within the acceptable noise signal level as shown in FIG. 5 because of the noise signal Nos' varying with time.

Figure 5:
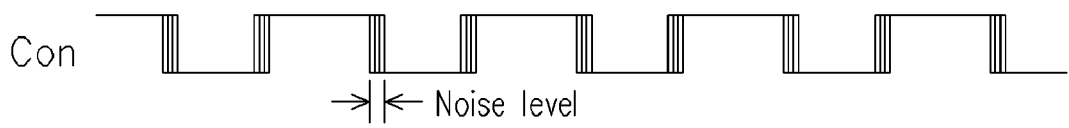
FIG. 5 is a diagram showing the waveform of the illumination control pulse signal produced by the illumination control pulse-generating unit shown in FIG. 4.

As shown in FIG. 5, although the duty cycle of the illumination control pulse signal Con varies on each transient moment of each cycle, the average power of the noise is zero in the time domain. Hence, the average duty cycle of the entire circuit after adding the noise is identical to one without adding any noise. In other words, the illumination of the light-emitting diodes after adding noise to the circuit is identical to the illumination without adding any noise to the circuit.

Figure 6:
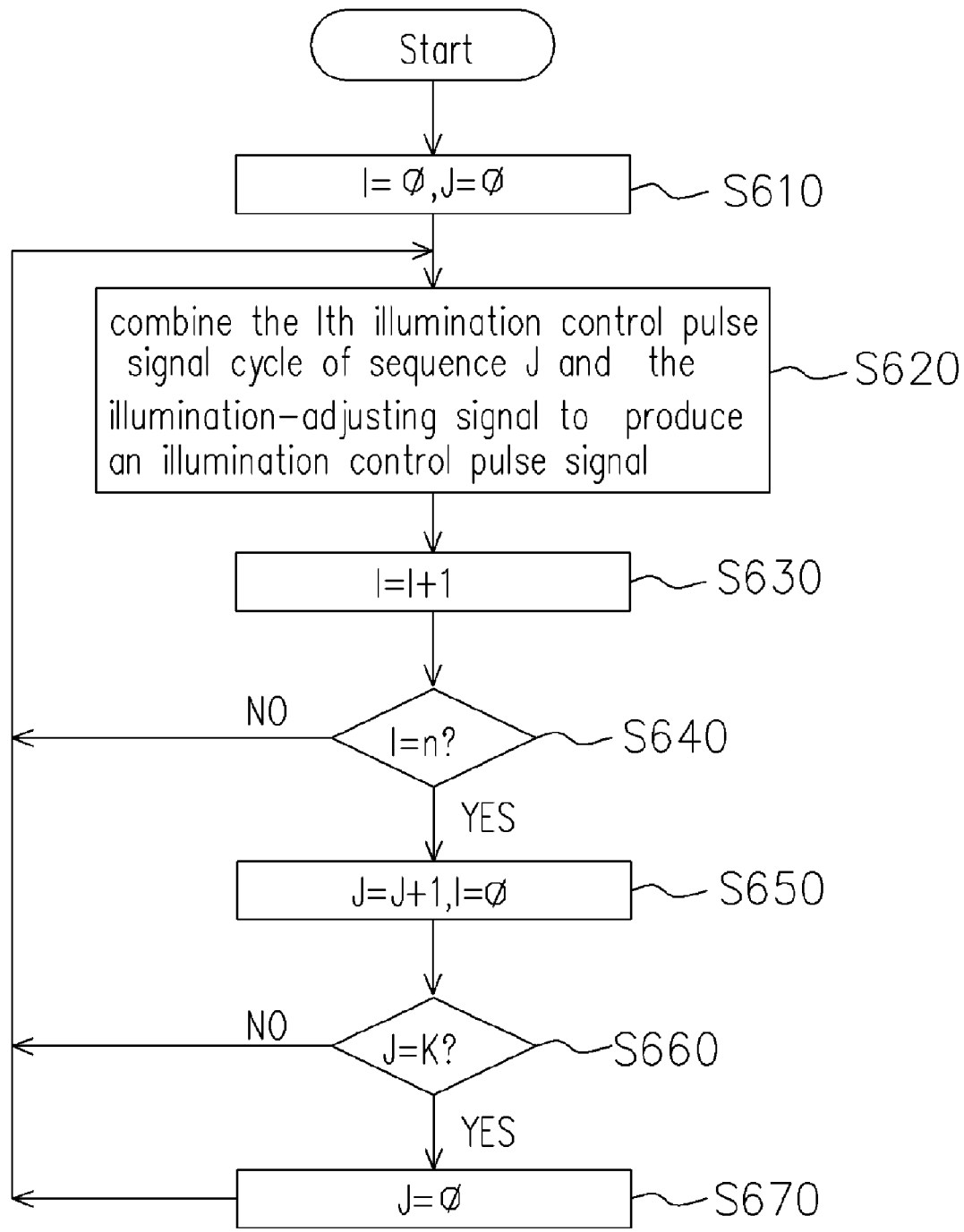
FIG. 6 is a flow chart showing the steps for operating the illumination control pulse-generating unit according to the preferred embodiment of the present invention.

FIG. 6 is a flow chart showing the steps for operating the illumination control pulse-generating unit according to the present invention. When the illumination control pulse-generating unit 310 as shown in FIG. 3 is implemented by using a microprocessor, the steps in FIG. 6 can be carried out to produce an illumination control pulse signal Con with a variable frequency as shown in FIG. 7 so that visual noise interference due to pulse width modulation is reduced.

Figure 7:
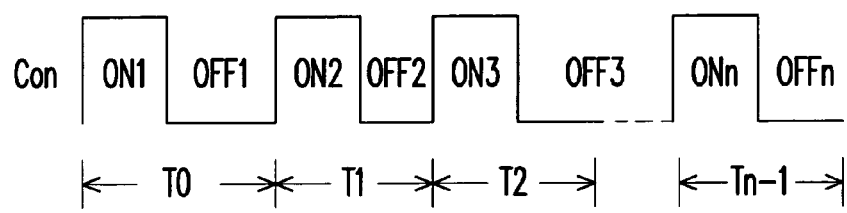
FIG. 7 is a diagram showing the waveform of the illumination control pulse signal produced by the illumination control pulse-generating unit shown in FIG. 6.

FIG. 7 shows the timing diagram of the illumination control pulse-generating unit according to the present invention in FIG. 6. Assuming that the illumination control pulse signal Con in FIG. 3 has a frequency F=1/T, where T is the cycle of the illumination control pulse signal Con, n illumination control pulse signals Con as shown in FIG. 7 with different cycle time such as T0, T1, T2, ..., Tn−1 such that (T0+T1+T2+ ... +Tn−1)/n=T can be designed. Furthermore, the n illumination control pulse signals C on with different cycle time can be permuted to form a queue before outputting each signal sequentially. For example, if sequence 0 is {T0, T1, T2, ..., Tn−1}, sequence 1 is {T0, T2, ..., } and so on, the n illumination control pulse signals Con with different cycle time may be arranged to form a list of K different non-repeating sequence including sequence 0, sequence 1, sequence 2, ..., sequence K-1. Thereafter, the steps depicted in FIG. 6 can be executed using the microprocessor so that illumination control pulse signals Con each having a different frequency are sequentially output. The operating steps of a digitally operated illumination control pulse-generating unit with a low visual noise level are explained as follows.

In step S610, variables I, J are set to 0. Thereafter, in step S620, the $I^{th}$ illumination control pulse signal cycle in sequence J and the received illumination-adjusting signal are combined to produce an illumination control pulse signal. In step S630, a 1 is added to the variable I in preparation for retrieving the next illumination control pulse signal cycle in sequence J. In step S640, the value of I is checked to determine whether it is equal to n. When the value of I is not equal to n, the operation returns to step S620. However, if the value of I is equal to n, step S650 is executed to reset I to 0 and add 1 to the value of J in preparation for retrieving the first illumination control pulse signal cycle of the next sequence. Thereafter, step S660 is executed to determine whether the value of J is equal to K. When the value of J is not equal to K, the operation returns to step S620. On the other hand, if the value of J is equal to K, step S670 is executed to reset the value of J to 0 and return the operation to step S620.

The steps carried out in aforementioned description assumes the existence of K sequences. However, anyone familiar with the technique may understand that the operation is greatly simplified when K is 1. In addition, the phase of the illumination control pulse signal generated in step S620 can be set to vary within a predetermined range so that the illumination control pulse signal with a wider frequency range is produced.

Figure 8:
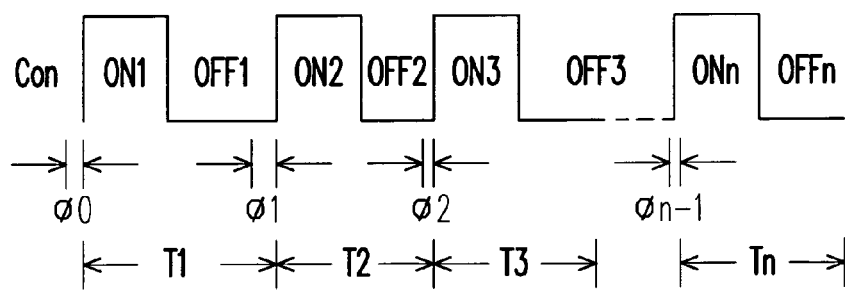
FIG. 8 is another diagram showing the waveform of the illumination control pulse signal produced by the illumination control pulse-generating unit shown in FIG. 6.

Similarly, if the illumination control pulse-generating unit 310 as shown in FIG. 3 is implemented using a microprocessor, the steps in FIG. 6 can be carried out to produce an illumination control pulse signal Con with a variable phase shift (the phase shift is varied with time) as shown in FIG. 8 so that visual noise interference due to pulse width modulation is reduced.

FIG. 8 shows a timing diagram of another illumination control pulse-generating unit according to the present invention in FIG. 6. The illumination control pulse signals Con in FIG. 8 with different phase shifts such as Ø0, Ø1, Ø2, ..., Øn−1 such that (Ø0+Ø1+Ø2+ ... +Øn−1)/n=360°×N (where N is a larger than one integer) can be designed. Moreover, the phase shifts can be phase leads or phase delays and preferably, the phase shifts are less than 360°. An illumination control pulse signal overlaps the previous one if its phase delay is larger than 360°, whereas, the illumination control pulse signal is missed if its phase leads is larger than 360°. In this example, the Con pulses of turning on the LEDs are constant; the timing of when to turn on the LED is different by different phase delay shifts.

From FIG. 8, it is clear that if we vary the phase shift of each pulse signal in the time domain, both the duty cycle and the ratio of turning the LEDs on and off of each pulse will not be identical. In FIG. 8, ON1=ON2=ON3, ... =ONn, but, OFF1≠OFF2≠OFF3≠, ... ≠OFFn because of the different phase shifts. As we know, the frequency of each pulse is turning on time plus turning off time. As the off time is different in each pulse, the frequency of each adjacent pulses (1/T1≠1/T2≠1/T3≠, ... ≠1/Tn) is varied.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. A low visual noise pulse width modulation illumination control circuit for controlling the illumination of light-emitting diodes inside a liquid crystal display, comprising:
  an illumination control pulse-generating unit, for receiving an illumination-adjusting signal and generating an illumination control pulse signal according to the illumination-adjusting signal, wherein a duty cycle of the illumination control pulse signal varies with time within a predetermined range; and
  a DC/DC converter, coupled to the illumination control pulse-generating unit for driving the light-emitting diodes according to the illumination control pulse signal.

2. The control circuit of claim 1, wherein the illumination control pulse-generating unit further comprises:
  a noise generator, for generating a noise signal;
  an analogue adder, coupled to the noise generator for receiving the illumination-adjusting signal and the noise signal to produce a noise signal loaded illumination-adjusting signal; and
  a comparator, coupled to the analogue adder for comparing the noise signal loaded illumination-adjusting signal with a triangular wave to produce the illumination control pulse signal.

3. The control circuit of claim 2, wherein the noise signals can be generated by amplifying a thermal noise produced by a resistor comprised in the noise generator.

4. A low visual noise pulse width modulation illumination control circuit for controlling the illumination of light-emitting diodes inside a liquid crystal display, comprising:
   an illumination control pulse-generating unit, for receiving an illumination-adjusting signal and generating an illumination control pulse signal according to the illumination-adjusting signal, wherein a phase shift, a frequency and a duty cycle of the illumination control pulse signal varies with time simultaneously within a predetermined range; and
   a DC/DC converter, coupled to the illumination control pulse-generating unit for driving the light-emitting diodes according to the illumination control pulse signal.

* * * * *